(12) United States Patent
Nakamura et al.

(10) Patent No.: US 11,437,636 B2
(45) Date of Patent: Sep. 6, 2022

(54) FUEL CELL SYSTEM

(71) Applicant: TOYOTA JIDOSHA KABUSHIKI KAISHA, Toyota (JP)

(72) Inventors: Shuhei Nakamura, Miyoshi (JP); Tsuyoshi Maruo, Okazaki (JP); Osamu Hamanoi, Toyota (JP); Hiroyuki Tsunekawa, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/221,019

(22) Filed: Apr. 2, 2021

(65) Prior Publication Data
US 2021/0376354 A1 Dec. 2, 2021

(30) Foreign Application Priority Data
May 27, 2020 (JP) .............................. JP2020-092106

(51) Int. Cl.
*H01M 8/04746* (2016.01)
*H01M 8/04029* (2016.01)
*H01M 8/04537* (2016.01)

(52) U.S. Cl.
CPC ... *H01M 8/04768* (2013.01); *H01M 8/04029* (2013.01); *H01M 8/04552* (2013.01); *H01M 8/04582* (2013.01); *H01M 2250/20* (2013.01)

(58) Field of Classification Search
CPC ......... H01M 2250/20; H01M 8/04029; H01M 8/04358; H01M 8/04552; H01M 8/04582; H01M 8/04589; H01M 8/04768; H01M 8/04992
See application file for complete search history.

(56) References Cited

U.S. PATENT DOCUMENTS

2016/0133971 A1* 5/2016 Naganuma ........ H01M 8/04768
  429/434
2020/0235412 A1* 7/2020 Sato .................... H01M 8/0494

FOREIGN PATENT DOCUMENTS

JP  2009043622 A  2/2009
JP  2016091921 A  5/2016

OTHER PUBLICATIONS

Namba et al., U.S. Appl. No. 17/088,108, filed Nov. 3, 2020, for Fuel Cell System and Method of Controlling Fuel Cell System.

* cited by examiner

*Primary Examiner* — Stewart A Fraser
*Assistant Examiner* — Brent C Thomas
(74) *Attorney, Agent, or Firm* — Dickinson Wright, PLLC

(57) ABSTRACT

A fuel cell system includes a fuel cell a current sensor that detects a current of the fuel cell, a plurality of cell voltage sensors that detects a voltage in a unit of one or two or more cells of the fuel cell among the cells, a pump that adjusts a flow rate of the cooling medium, and a controller. The controller estimates, in a first case, a calorific value of the fuel cell using each detected cell voltage value and the detected current value, decides the flow rate of the cooling medium based on the estimated calorific value, and controls the operation of the pump such that the flow rate of the cooling medium is lower than that of a case where the estimated calorific value is the same in a normal operation of the fuel cell.

3 Claims, 5 Drawing Sheets

FUEL CELL SYSTEM

CROSS-REFERENCE TO RELATED APPLICATION

This application claims priority to Japanese Patent Application No. 2020-092106 filed on May 27, 2020, incorporated herein by reference in its entirety.

BACKGROUND

1. Technical Field

The present disclosure relates to a fuel cell system.

2. Description of Related Art

In the related art, a technique is disclosed in which, in order to suppress a cell from refreezing by a coolant circulating in a fuel cell, when the fuel cell is started to operate below a freezing point, a flow rate of the coolant is adjusted depending on an inlet temperature such that the flow rate of the coolant becomes lower than the flow rate of a case where a calorific value is the same in a normal operation of the fuel cell.

SUMMARY

In the technique in the related art, the calorific value of the fuel cell is decided by using, for example, a total voltage value and a current value of the fuel cell. However, in a case where the calorific value is decided by using the total voltage value and the current value of the fuel cell, the decided calorific value may be significantly different from an actual calorific value of the fuel cell. In this case, a flow rate adjustment of the coolant in which the actual calorific value is accurately reflected may be not performed.

The present disclosure can be implemented as a following aspect.

(1) An aspect of the present disclosure provides a fuel cell system. A fuel cell system according to an aspect of the present disclosure includes a fuel cell in which cells of a plurality of cells are stacked, a current sensor, a plurality of cell voltage sensors, a circulation flow path, a circulation pump, and a controller. The current sensor is configured to detect a current of the fuel cell. The cell voltage sensors are configured to detect a voltage in a unit of one or two or more cells among the cells. The circulation flow path of a cooling medium has an internal flow path that is formed inside the fuel cell and an external flow path that is connected to the internal flow path and formed outside the fuel cell. The circulation pump is disposed in the external flow path and configured to adjust a flow rate of the cooling medium. The controller is configured to, in a first case where a temperature of the cooling medium at an inlet of the external flow path to the internal flow path is lower than a predetermined threshold value, decide the flow rate of the cooling medium based on an estimated calorific value such that the flow rate of the cooling medium is lower than that of a case where the estimated calorific value is the same in a normal operation of the fuel cell, control an operation of the circulation pump, and adjust the flow rate of the cooling medium in the circulation flow path to the decided flow rate. The controller is configured to, in the first case, estimate a calorific value of the fuel cell by using each detected cell voltage value detected by the cell voltage sensors and a detected current value detected by the current sensor, decide the flow rate of the cooling medium based on the estimated calorific value, and control the operation of the circulation pump. According to the aspect, by estimating the calorific value by using a detected cell voltage of the cell voltage sensor, whether a power generation reaction occurs in each of one or more cells can be reflected in the estimation of the calorific value. As a result, the estimated calorific value can be suppressed from being significantly different from the actual calorific value of the fuel cell, and thus a flow rate adjustment of the cooling medium in which the actual calorific value is accurately reflected can be performed.

(2) The fuel cell system according to the aspect may further include a voltage sensor configured to detect a total voltage of the fuel cell, in which the controller is configured to calculate a total number of specific cells that are cells in which a cell voltage is equal to or lower than a predetermined reference voltage by using the detected cell voltage value, correct a reference calorific value derived by using the detected current value and a detected voltage value detected by the voltage sensor to be lower as the total number of the specific cells increases, and estimate the calorific value. The power generation reaction does not occur in the cell in which a voltage is equal to or lower than the reference voltage, and the cell can be estimated not to generate heat. According to the aspect, by correcting the calorific value to be lower as the total number of the specific cells increases, the estimated calorific value is suppressed from being significantly different from the actual calorific value of the fuel cell, and thus a flow rate adjustment of the cooling medium in which the actual calorific value is accurately reflected can be performed.

(3) In the fuel cell system according to the aspect, the controller may be configured to correct the reference calorific value by multiplying the reference calorific value by a ratio of the number obtained by subtracting the total number of the specific cells from a total number of the cells to the total number of the cells, and estimate the calorific value. According to the aspect, by using the total number of the cells and the total number of the specific cells, the reference calorific value can be corrected to be lower as the total number of the specific cells increases. By using the total number of the specific cells that are estimated not to generate heat, a flow rate adjustment of the cooling medium in which the actual calorific value is accurately reflected can be performed.

(4) In the fuel cell system according to the aspect, the controller may be configured to, for each reference calorific value, correct the reference calorific value by using a map in which the calorific value is associated with the total number of the specific cells, the map having the calorific value being lower as the total number of the specific cells increases, and estimate the calorific value. According to the aspect, by using the map in which the calorific value is associated with the total number of the specific cells, the reference calorific value can be corrected to be lower as the total number of the specific cells increases. By using the total number of the specific cells that are estimated not to generate heat, a flow rate adjustment of the cooling medium in which the actual calorific value is accurately reflected can be performed.

The present disclosure can be implemented as the various aspects of the fuel cell system. The present disclosure can be implemented as a control method of a fuel cell system, a computer program that realizes the control method, a non-temporary recording medium on which the computer program is recorded, or the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
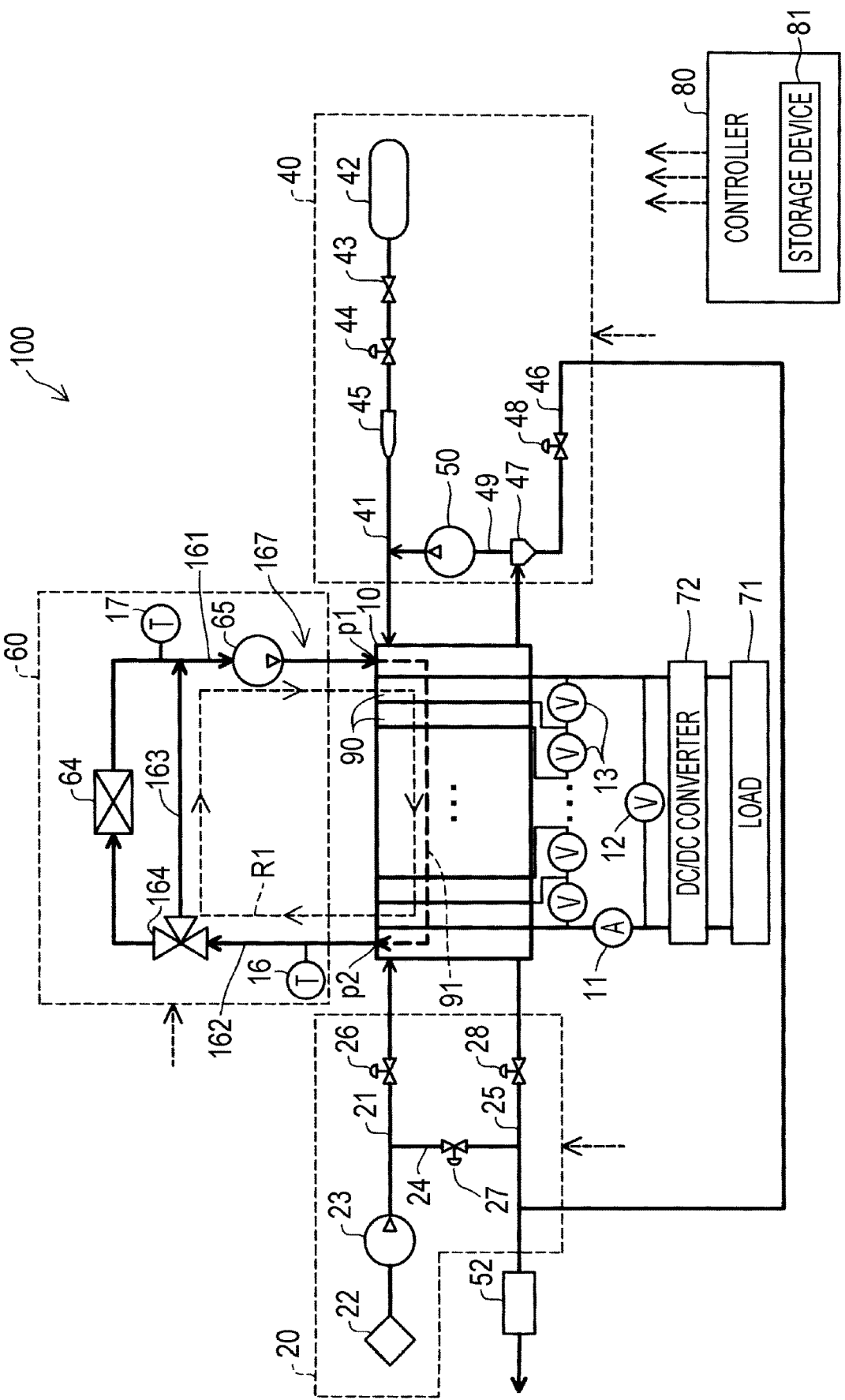
FIG. 1 is an explanatory diagram showing a schematic configuration of a fuel cell system mounted on a vehicle.

FIG. 1 is a diagram showing a schematic configuration of a fuel cell system 100 mounted on a vehicle. The fuel cell system 100 includes a fuel cell 10, an oxidizing gas system circuit 20, a fuel gas system circuit 40, a cooling system circuit 60, a load 71, a DC/DC converter 72, a controller 80, a current sensor 11, a voltage sensor 12, a plurality of cell voltage sensors 13, temperature sensors 16, 17, and a muffler 52. The fuel cell 10 uses fuel gas and oxidizing gas to generate power by a power generation reaction. The fuel cell 10 is a polymer electrolyte fuel cell, and has a stack structure in which cells of a plurality of cells 90 are stacked. The cell 90 has a structure in which a membrane electrode and gas diffusion layer assembly (MEGA) (not shown) is interposed with separators (not shown) therebetween. The MEGA includes a membrane electrode assembly (MEA) and a gas diffusion layers disposed on both sides of the MEA. The MEA includes an electrolyte membrane, an electrode catalyst layer that is formed on one surface of the electrolyte membrane functioning as an anode, and an electrode catalyst layer that is formed on the other surface of the electrolyte membrane functioning as a cathode. In the present embodiment, hydrogen is used as the fuel gas, and oxygen in the air is used as the oxidizing gas. The power generated by the fuel cell 10 is consumed by being supplied to the load 71 after being boosted by the DC/DC converter 72. The load 71 is, for example, a vehicle driving motor.

The current sensor 11 is provided between the fuel cell 10 and the load 71, and detects an output current of the fuel cell 10. The voltage sensor 12 is provided between both electrodes of the fuel cell 10, and detects a total voltage of the fuel cell 10. Each of the cell voltage sensors 13 detects the voltage of the cell 90 in a unit of one cell 90.

The controller 80 includes a central processing unit (CPU) (not shown) and a storage device 81, and controls the oxidizing gas system circuit 20, the fuel gas system circuit 40, and the cooling system circuit 60. The storage device 81 stores a program of a flow rate control process described below and values of a warming end temperature and a reference voltage used in the flow rate control process, in advance. The current sensor 11, the voltage sensor 12, the cell voltage sensors 13, and the temperature sensors 16, 17 are respectively connected to the controller 80. Detected values detected by the current sensor 11, the voltage sensor 12, the cell voltage sensors 13, and the temperature sensors 16, 17 are transmitted to the controller 80. Each of the cell voltage sensors 13 is numbered regarding the cell voltage sensor 13 provided in one of the cells 90 at both ends of the fuel cell 10 as number 1. Each detected voltage value is assigned with the number of the corresponding cell voltage sensor 13 and transmitted to the controller 80. As a result, the controller 80 can specify which cell voltage sensor 13 the detected voltage value is transmitted from.

The oxidizing gas system circuit 20 is a circuit for supplying air to the cathode of the fuel cell 10. The oxidizing gas system circuit 20 includes an oxidizing gas supply pipe 21, an air cleaner 22, an air compressor 23, a bypass pipe 24, an oxidizing off gas discharge pipe 25, an oxidizing gas supply valve 26, a bypass valve 27, and a cathode off gas exhaust valve 28. The oxidizing gas supply pipe 21 connects the air cleaner 22 to the cathode of the fuel cell 10, specifically, an oxidizing gas introduction port (not shown). The oxidizing off gas discharge pipe 25 communicates an oxidizing off gas discharge port (not shown) of the fuel cell 10 with the atmosphere. The muffler 52 is disposed in the oxidizing off gas discharge pipe 25. The air compressor 23 compresses air from which dust is removed by the air cleaner 22, and supplies the compressed air to the fuel cell 10 via the oxidizing gas supply pipe 21. The oxidizing gas supply valve 26 is disposed in the oxidizing gas supply pipe 21, and blocks or allows the supply of air to the fuel cell 10 by opening and closing a flow path of the oxidizing gas supply pipe 21. The cathode off gas exhaust valve 28 is disposed in the oxidizing off gas discharge pipe 25, and controls a discharge amount of a cathode off gas discharged from the oxidizing off gas discharge port of the fuel cell 10 to adjust a back pressure of the fuel cell 10. The bypass pipe 24 connects the oxidizing gas supply pipe 21 and the oxidizing off gas discharge pipe 25. The bypass valve 27 is disposed in the bypass pipe 24, and cooperates with the air compressor 23 and the cathode off gas exhaust valve 28 to adjust a flow rate of air flowing in the fuel cell 10.

The fuel gas system circuit 40 is a circuit for supplying the fuel gas to the anode of the fuel cell 10. The fuel gas system circuit 40 includes a fuel gas supply pipe 41, a fuel gas tank 42 that is a source of fuel gas, a main stop valve 43, a pressure adjusting valve 44, an injector 45, a fuel exhaust gas pipe 46, a gas liquid separator 47, an exhaust and drain valve 48, a recirculation pipe 49, and a recirculation pump 50. The fuel gas supply pipe 41 connects the fuel gas tank 42 to the anode of the fuel cell 10, specifically, a fuel gas introduction port (not shown). The fuel gas tank 42 stores high pressure hydrogen gas. The main stop valve 43, the pressure adjusting valve 44, and the injector 45 are disposed in the fuel gas supply pipe 41 in this order from the fuel gas tank 42 toward the fuel cell 10. The main stop valve 43 blocks or allows the supply of the hydrogen gas from the fuel gas tank 42 by opening and closing the flow path of the fuel gas supply pipe 41. The pressure adjusting valve 44 reduces the pressure of the high pressure hydrogen gas to a predetermined hydrogen pressure. The injector 45 is provided for adjusting the supply amount of the hydrogen gas to the fuel cell 10. The fuel exhaust gas pipe 46 connects a fuel off gas discharge port (not shown) of the fuel cell 10 to the oxidizing off gas discharge pipe 25. The gas liquid separator 47 and the exhaust and drain valve 48 are disposed in the fuel exhaust gas pipe 46 in this order from the fuel cell 10 toward the muffler 52. The recirculation pipe 49 connects the gas liquid separator 47 to the fuel gas supply pipe 41 on the downstream side of the injector 45. The fuel off gas discharged from the fuel off gas discharge port of the fuel cell 10 is separated into gas components and liquid components by the gas liquid separator 47. The exhaust and drain valve 48 switches the fuel exhaust gas pipe 46 between communication and non-communication. The gas component of the fuel off gas separated by the gas liquid separator 47 is returned to the fuel gas supply pipe 41 by the recirculation pump 50. Therefore, unreacted hydrogen contained in the fuel off gas is reused. In a case where the concentration of the gas component other than the hydrogen gas in the fuel off gas is high, the exhaust and drain valve 48 is opened to discharge the liquid component and the fuel off gas. The fuel off gas flowing through the fuel exhaust gas pipe 46 and the cathode off gas flowing through the oxidizing off gas discharge pipe 25 are mixed, and exhausted via the muffler 52.

The cooling system circuit 60 is a circuit for adjusting the temperature of the fuel cell 10 by allowing the coolant as the cooling medium to circulate. The cooling system circuit 60 includes a radiator 64, a circulation pump 65, a coolant supply path 161, a coolant discharge path 162, a bypass flow path 163, and a three-way valve 164. A coolant manifold 91 as an internal flow path for allowing the coolant to circulate is formed inside the fuel cell 10. In FIG. 1, the coolant manifold 91 is schematically represented by a broken line. In the present embodiment, the coolant manifold 91 has a structure in which the coolant manifold 91 for supply formed along a stack direction of the cell 90 and the coolant manifold 91 for discharge are connected to each other via a coolant flow path in the cell 90. The coolant supply path 161 connects a lead out port of the radiator 64 and the coolant manifold 91 for supply. Here, a connection point of the coolant supply path 161 with the coolant manifold 91 for supply is referred to as an inlet p1. The circulation pump 65 is disposed in the coolant supply path 161. The coolant discharge path 162 connects the coolant manifold 91 for discharge and the introduction port of the radiator 64. Here, a connection point of the coolant discharge path 162 with the coolant manifold 91 for discharge is referred to as an outlet p2. The three-way valve 164 is disposed in the coolant discharge path 162. A first end of the bypass flow path 163 is connected to the coolant discharge path 162 via the three-way valve 164, and a second end is connected to the coolant supply path 161. The radiator 64 cools the coolant flowing from the coolant discharge path 162 via the introduction port by blowing air from an electric fan (not shown), and discharges the cooled coolant to the coolant supply path 161 via the lead out port.

The three-way valve 164 is disposed at a connection point between the coolant discharge path 162 and the bypass flow path 163. The flow rate of the coolant flowing in the radiator 64 is adjusted by an opening degree of the three-way valve 164. Here, a flow path formed by the coolant manifold 91, the coolant discharge path 162 from the outlet p2 to the three-way valve 164, the bypass flow path 163, and the coolant supply path 161 from the connection point with the bypass flow path 163 to the inlet p1 is referred to as a circulation flow path R1. Here, a flow path formed by the coolant discharge path 162 from the outlet p2 to the three-way valve 164, the bypass flow path 163, and the coolant supply path 161 from the connection point with the bypass flow path 163 to the inlet p1 is referred to as an external flow path 167. The external flow path 167 is connected to the coolant manifold 91 that is the internal flow path and formed outside the fuel cell 10. In a case where the three-way valve 164 is fully closed, the coolant flowing from the coolant manifold 91 of the fuel cell 10 to the coolant discharge path 162 is directed toward the bypass flow path 163 without directing to the radiator 64. Therefore, in a case where the three-way valve 164 is fully closed, the coolant circulates solely through the circulation flow path R1. The circulation pump 65 is disposed between the inlet p1 and the connection point with the bypass flow path 163, and the flow rate of the coolant flowing in the circulation flow path R1 is adjusted by the circulation pump 65. As the coolant, for example, an antifreeze solution, such as water containing ethylene glycol, is used. The temperature sensor 16 is provided near the outlet p2 of the coolant discharge path 162. The temperature sensor 17 is provided between the radiator 64 and the connection point between the coolant supply path 161 and the bypass flow path 163.

A normal operation and a warming operation of the fuel cell 10 will be described. In the normal operation, power is generated by supplying air equal to or larger than the theoretical air amount needed to generate target output power. On the other hand, in the warming operation, in order to reduce the operation efficiency, power is generated with an amount of air less than an amount of air supplied in the normal operation. In the warming operation, an air stoichiometric ratio is, for example, about 1.0. The air stoichiometric ratio is a ratio of the amount of air actually supplied to the theoretical air amount of needed to generate the target output power. In the warming operation, by operating the fuel cell 10 at a low efficiency operating point, the concentration overvoltage increases, and the fuel cell 10 is warmed by self-heating.

The warming operation is mainly performed in a case where the outside air temperature is below a freezing point. Below the freezing point, the water remaining in the fuel cell 10 generated in the previous traveling may freeze, and the flow path of the fuel gas in the fuel cell 10 may be partially blocked. Therefore, the pressure loss of the fuel gas increases, an actual supply amount of the fuel gas decreases with respect to a target supply amount of the fuel gas, and the cell 90 in which the power generation reaction does not occur is generated. In the cell 90 in which the power generation reaction does not occur, an actual cell voltage is reduced with respect to a target cell voltage and typically becomes a negative voltage. Therefore, in the flow rate control process described below, estimation is made that the power generation reaction does not occur in the cell 90 in which a cell voltage is equal to or lower than the predetermined reference voltage. In the following description, the cell 90 in which the cell voltage is equal to or lower than the reference voltage may be referred to as a "specific cell". Here, the inventors have noted that self-heating does not occur in the cell 90 in which the power generation reaction does not occur. In the flow rate control process described below, the estimated calorific value is decided depending on the total number of the specific cells, and the flow rate of the coolant flowing through the circulation flow path R1 is adjusted depending on the decided estimated calorific value. Therefore, a flow rate adjustment of the coolant in which the actual calorific value is accurately reflected can performed.

After activation, the controller 80 determines whether the warming operation is requested based on, for example, the detected value detected by the temperature sensor (not shown) that is provided in the oxidizing gas supply pipe 21 (FIG. 1) to detect the outside air temperature. For example, the controller 80 determines that the warming operation is requested in a case where the detected outside air temperature is below the freezing point, and determines that the warming operation is not requested in a case where the detected outside air temperature is equal to or higher than the freezing point. In a case where the determination is made that the warming operation is not requested, the controller 80 starts the normal operation. In a case where the determination is made that the warming operation is requested, the controller 80 switches a warming operation flag on and starts the warming operation. At the start of the warming operation, the three-way valve 164 is fully closed. Therefore, the heat generated by the fuel cell 10 is suppressed from being discharged to the outside of the system. Further, in a case where the warming operation ends, the controller 80 switches the warming operation flag off and shifts to the normal operation.

Figure 2:
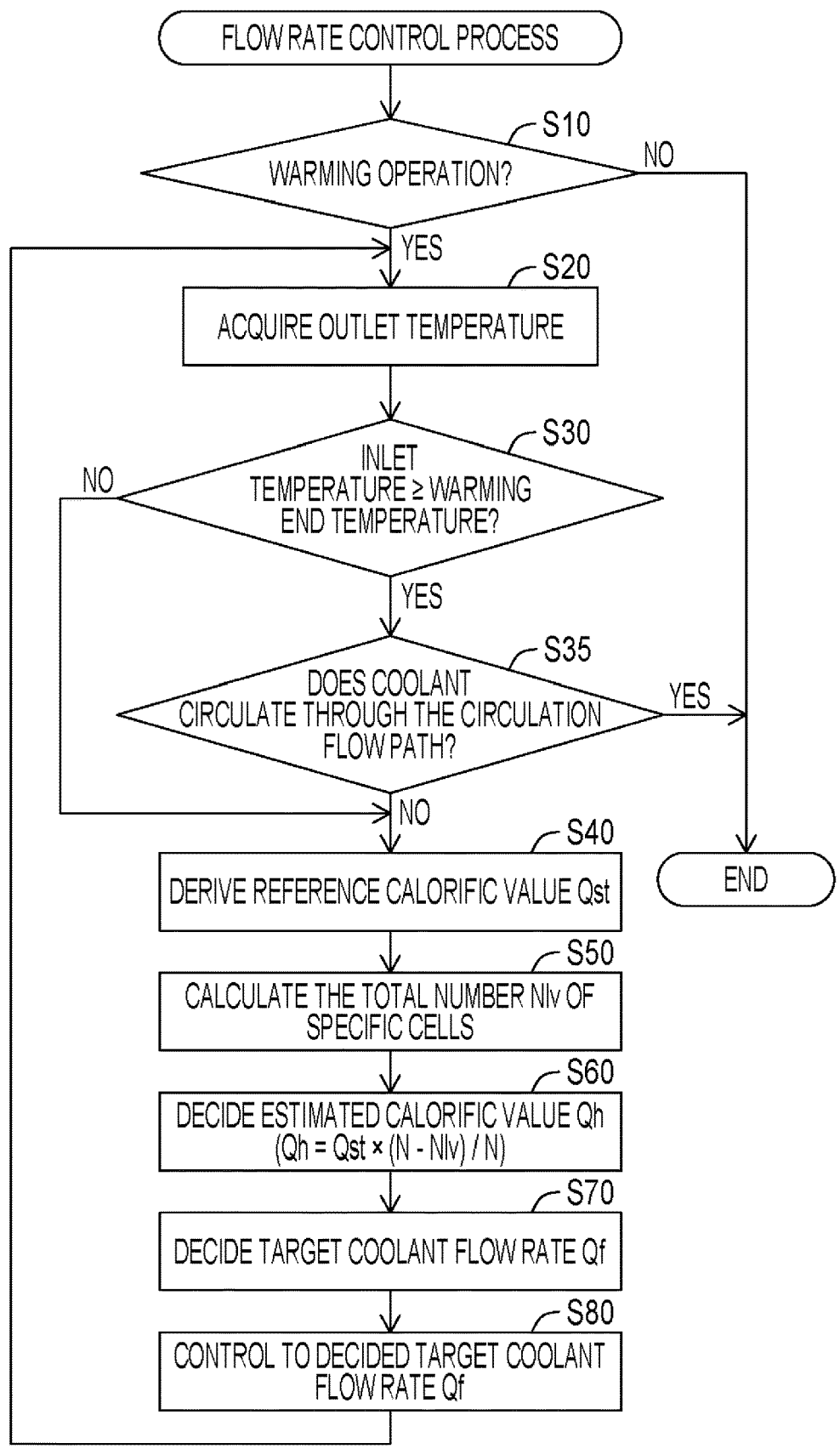
FIG. 2 is a flowchart of a flow rate control process according to a first embodiment.

The flow rate control process executed by the controller 80 will be described with reference to FIG. 2. After activation, the controller 80 executes the flow rate control process. The controller 80 determines whether the fuel cell 10 is in the warming operation (step S10). The controller 80 refers to the warming operation flag, determines that the fuel cell 10 is not in the warming operation in a case where the warming operation flag is off (step S10: NO), and terminates the processing routine. In a case where the warming operation flag is on, the controller 80 determines that the fuel cell 10 is in the warming operation (step S10: YES), acquires the detected temperature of the temperature sensor 16, and stores the acquired detected temperature in the storage device 81 as an outlet temperature (step S20). The controller 80 estimates an inlet temperature that is a temperature at the inlet p1 of the external flow path to the internal flow path, and determines whether the estimated inlet temperature is equal to or higher than the warming end temperature (step S30). Specifically, the controller 80 estimates the inlet temperature based on the detected temperature of the temperature sensor 17 and a coolant flow rate of the circulation flow path R1. The controller 80 refers to a map in which a correlation of the detected temperature of the temperature sensor 17, the coolant flow rate, and the inlet temperature is defined, and acquires the inlet temperature corresponding to the acquired detected temperature and the coolant flow rate according to a drive instruction value of the circulation pump 65. The correlation of the detected temperature of the temperature sensor 17, the coolant flow rate, and the inlet temperature is obtained in advance by an experiment, and is stored in the storage device 81. The temperature sensor 17 is disposed near the external flow path 167, the detected temperature of the temperature sensor 17 is close to the temperature of the external flow path 167, and thus the detected temperature can be used for estimating the inlet temperature. Here, the warming end temperature is a predetermined temperature, and is a temperature at which the power generation of the cell 90 is highly efficient, for example, a temperature of 72° C. or higher and 80° C. or lower.

In a case where the determination is made that the inlet temperature is not equal to or higher than the warming end temperature, that is, lower than the warming end temperature (step S30: NO), the controller 80 derives, by assuming that the same value of current flows in all of the cells 90, a reference calorific value Qst by using Equation (1) below (step S40).

$$Qst = (\text{theoretical electromotive force} \times \text{total number } N \text{ of cells} - \text{total voltage}) \times \text{current} \qquad \text{Equation (1)}$$

In Equation (1), the theoretical electromotive force [V] is a value determined by the configuration of the cell 90, and is, for example, 1.4 V. A total number N of the cells is the total number of the cells 90. A total voltage [V] and the current [A] are the voltage and current of the fuel cell 10. In the present embodiment, the detected voltage value of the voltage sensor 12 is used as the total voltage, and the detected current value of the current sensor 11 is used as the current. The controller 80 calculates the reference calorific value Qst by substituting the theoretical electromotive force and the total number N of the cells stored in the storage device 81 in advance, and the acquired detected voltage value of the voltage sensor 12 and the acquired detected current value of the current sensor 11 for Equation (1) stored in the storage device 81.

The controller 80 calculates a total number Nlv of the specific cells that is the total number of the specific cells (step S50). Specifically, the controller 80 counts the number of the cells 90 determined to have the detected cell voltage value equal to or lower than the reference voltage among the cell voltage value detected by the cell voltage sensors 13. The controller 80 decides the counted number of the cells 90 determined to have the detected cell voltage equal to or lower than the reference voltage as the total number Nlv of the specific cells. The reference voltage need only be a voltage that can be estimated that the power generation reaction does not occur in the cell 90, and is, for example, 0 V. As described above, in the cell 90 determined to have the detected cell voltage equal to or lower than the reference voltage, the estimation is made that the power generation reaction does not occur and no heat is generated.

The controller 80 decides an estimated calorific value Qh, by using Equation (2) below, as the estimated calorific value of the fuel cell 10 (step S60).

$$Qh = Qst \times (Nlv)/N \qquad \text{Equation (2)}$$

The definitions of the parameters in Equation (2) are as follows.

Qst: reference calorific value
N: total number of cells
Nlv: total number of specific cells Specifically, the controller 80 calculates the estimated calorific value Qh by substituting the total number N of the cells of the cell 90 stored in the storage device 81 in advance, the reference calorific value Qst calculated in step S40, and the total number of Nlv of the specific cells decided in step S50 for Equation (2) stored in the storage device 81 in advance. As a result, the estimated calorific value Qh in which the reference calorific value Qst is corrected to be lower as the total number Nlv of the specific cells increases can be calculated. In the specific cell, the estimation is made that the power generation reaction does not occur, no heat is generated, that is, the calorific value is zero, and thus the estimated calorific value Qh in which the actual calorific value is reflected can be calculated by using Equation (2). In a case where the specific cell is present, the detected voltage value of the fuel cell 10 is also to be small, and thus the reference calorific value Qst is different from the value in a case where no specific cell is present. Here, in the cell 90 in which the power generation reaction occurs and the cell 90 in which the power generation reaction does not occur, the calorific values are significantly different even when the cell voltages are slightly different. In a case where the calorific value of the fuel cell 10 is estimated based on the total voltage, the calorific value is estimated by assuming that the all of the cells 90 have the same cell voltage, and thus the inclusion of the cells 90 that do not generate the power is not considered in the value. As compared with a case where the cell 90 having a target cell voltage is solely included, in a case where the cell 90 in which the cell voltage is larger than the target cell voltage and the cell 90 having a negative voltage are mixed, even when the total voltages are the same, the calorific value of the cell 90 having the negative voltage is zero, and thus the estimated calorific value in a case where the cells are mixed may be a value different from the actual calorific value. That is, in many cases, the actual calorific value is not sufficiently reflected in the reference calorific value Qst calculated based on the detected voltage value and the detected current value of the fuel cell 10.

Therefore, the estimated calorific value Qh in which the actual calorific value is reflected can be calculated by correcting the reference calorific value Qst by using the total number Nlv of the specific cells.

Figure 3:
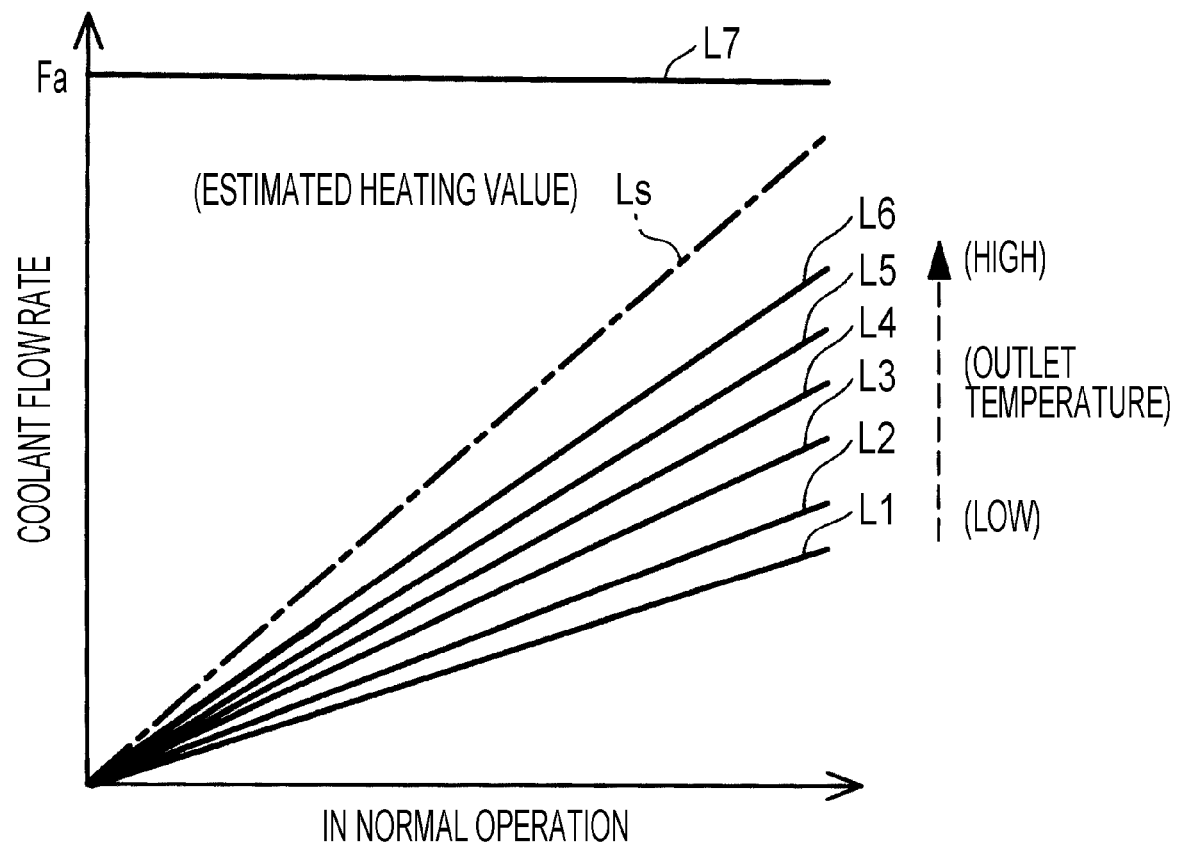
FIG. 3 is a map of a coolant flow rate according to the first embodiment.

After step S60, the controller 80 decides a target coolant flow rate Qf by using a map of the coolant flow rate shown in FIG. 3 (step S70). A horizontal axis of FIG. 3 shows the estimated calorific value of the fuel cell 10, and a vertical axis shows the coolant flow rate represented by a moving volume per unit time. In the map of the coolant flow rate, the estimated calorific value of the fuel cell 10 is associated with the coolant flow rate. A characteristic line Ls is a characteristic line used in the normal operation. Characteristic lines L1 to L7 are characteristic lines used in the warming operation. Among these, the characteristic lines L1 to L6 are characteristic lines applied in a case where the inlet temperature is lower than a lower limit temperature in a temperature range in which the generated water does not freeze. Also, the characteristic line L7 is a characteristic line applied in a case where the inlet temperature is equal to or higher than the lower limit temperature in the temperature range in which the generated water does not freeze. The lower limit temperature in the temperature range in which the generated water does not freeze is, for example, 0° C. The characteristic lines L1 to L6 correspond to different outlet temperatures, and the outlet temperatures corresponding to L1, L2, L3, L4, L5, L6 are larger in this order. The characteristic lines L1 to L6 and the characteristic lines Ls are represented by straight lines in which the coolant flow rate increases as the estimated calorific value increases. The characteristic line L7 has a constant flow rate Fa regardless of the estimated calorific value.

In a case where the inlet temperature of the fuel cell 10 is lower than the lower limit temperature in the temperature range in which the generated water does not freeze, the cell 90 is cooled by the lower-temperature coolant, and thus cooling of the cell 90 is promoted when the coolant flow rate is large, the generated water may refreeze. Then, the characteristic lines L1 to L6 are used. By using the characteristic lines L1 to L6, if the estimated calorific values are the same, the coolant flow rate flowing through the circulation flow path R1 is set to be lower as the temperature of the fuel cell 10 is lower, and thus the generated water can be suppressed from refreezing. Further, the characteristic lines L1 to L6 have a characteristic that the coolant flow rate increases as the estimated calorific value increases. By using the characteristic lines L1 to L6, the coolant flow rate flowing through the circulation flow path R1 is set to be large as the estimated calorific value is large, and thus the heat exchange between the cells 90 is promoted. Therefore, the non-uniformity of heat in the fuel cell 10 can be reduced. However, in a case where the inlet temperature is lower than the lower limit temperature in the temperature range in which the generated water does not freeze, refreezing may occur, so that the coolant flow rate in the characteristic lines L1 to L6 is suppressed to be lower than the coolant flow rate in the normal operation.

As described above, the characteristic line L7 is a characteristic line used in a case of the warming operation and the inlet temperature of the fuel cell 10 being equal to or higher than the lower limit temperature in the temperature range in which the generated water does not freeze. In a case where the inlet temperature of the fuel cell 10 equal to or higher than the lower limit temperature in the temperature range in which the generated water does not freeze, the refreezing does not occur even when the coolant flow rate is large. Therefore, in order to reduce the non-uniformity of the heat in the fuel cell 10, the characteristic line L7 has a coolant flow rate larger than the coolant flow rate of the characteristic line Ls used in the normal operation. By using the characteristic line L7, the coolant flow rate increases, the non-uniformity of the heat is reduced, and the operation time of the warming operation can be reduced.

In step S70, the controller 80 selects any characteristic line among the characteristic lines L1 to L7 depending on the inlet temperature and the outlet temperature, and decides the coolant flow rate corresponding to the estimated calorific value Qh in the selected characteristic line as the target coolant flow rate Qf. As described above, any of the characteristic lines L1 to L6 is selected in a first case where the inlet temperature is lower than the lower limit temperature in the temperature range in which the generated water does not freeze. On the other hand, the characteristic line L7 is selected in a second case where the inlet temperature is equal to or higher than the lower limit temperature in the temperature range in which the generated water does not freeze. The inlet temperature is lower than the outlet temperature, and thus the characteristic line L7 is selected in a case where the inlet temperature is equal to or higher than the lower limit temperature in the temperature range in which the generated water does not freeze and the risk of refreezing is sufficiently low. Here, the lower limit temperature in the temperature range in which the generated water does not freeze functions as a threshold value in a case where the control of the flow rate of the coolant is performed.

In step S70, a case where any characteristic line among the characteristic lines L1 to L6 is selected is a case where cooling of the cell 90 is promoted when the coolant flow rate is large, and refreezing of the generated water may occur. Here, in step S60, the estimated calorific value Qh is corrected to be lower with respect to the reference calorific value Qst as the total number Nlv of the specific cells increases. Therefore, in a case where the specific cell is present, the target coolant flow rate Qf is a value lower than the coolant flow rate decided by using the reference calorific value Qst before correction. The target coolant flow rate Qf is the value in which the actual calorific value is reflected, even in a case where the specific cell is present, refreezing of the generated water due to setting of the coolant flow rate to be large with respect to the actual calorific value can be suppressed. Excessive flow rate of coolant can be suppressed.

The controller 80 generates the drive instruction value depending on the target coolant flow rate Qf decided in step S70 and transmits the generated drive instruction value to the circulation pump 65 to control the operation of the circulation pump 65 such that the flow rate of the coolant in the circulation flow path R1 becomes the target coolant flow rate Qf (step S80). As a result, control is performed at the target coolant flow rate Qf in which the actual calorific value is reflected.

After executing step S80, the controller 80 returns to the step S20, and repeatedly executes steps S40 to S80 until the determination is made that the inlet temperature is equal to or higher than the warming end temperature. The determination is made that the inlet temperature is equal to or higher than the warming end temperature (step S30: YES), the controller 80 measures an elapsed time from the determination that the inlet temperature is equal to or higher than the warming end temperature, and determines whether the coolant has circulated through the circulation flow path R1 (step S35). Specifically, the controller 80 calculates a circulation time needed to circulate through the circulation flow path R1 at the decided target coolant flow rate Qf by using the volume of the circulation flow path R1 stored in the storage device 81 in advance and the target coolant flow rate Qf, and determines whether the elapsed time is equal to or longer than the circulation time. In a case where the determination is made that the coolant does not circulate through the circulation flow path R1 (step S35: NO), the controller 80 proceeds to step S40. In a case where the determination is made that the coolant has circulated through the circulation flow path R1 (step S35: YES), the controller 80 terminates the processing routine. In the normal operation, as described above, the target coolant flow rate Qf is decided by using the characteristic line Ls. As the estimated calorific value used for deciding the target coolant flow rate Qf, the reference calorific value Qst calculated by using the detected voltage value of the voltage sensor 12 and the detected current value of the current sensor 11 is used.

According to the first embodiment described above, the controller 80 decides the estimated calorific value Qh as the estimated calorific value of the fuel cell 10 by using the detected cell voltage value and the detected current value (step S60), decides the target coolant flow rate Qf based on the estimated calorific value Qh (step S70), and controls the operation of the circulation pump 65 (step S80). Therefore, whether the power generation reaction occurs for each cell 90 can be reflected in the decision of the estimated calorific value Qh. As a result, the decided estimated calorific value Qh can be suppressed from being significantly different from the actual calorific value of the fuel cell 10, and thus a flow rate adjustment of the coolant in which the actual calorific value is accurately reflected can performed.

Also, the controller 80 calculates the total number Nlv of the specific cells by using the detected cell voltage value (step S50), corrects the reference calorific value Qst to be lower as the total number Nlv of the specific cells increases (step S60), and decides the estimated calorific value Qh. Therefore, the calorific value is corrected to be lower as the total number Nlv of the specific cells increases, a flow rate adjustment of the coolant in which the actual calorific value is accurately reflected can performed.

Further, in step S60, the controller 80 decides the estimated calorific value Qh by multiplying the reference calorific value Qst by a ratio of the number obtained by subtracting the total number Nlv of the specific cells from the total number N of the cells to the total number N of the cells. As a result, the reference calorific value Qst can be corrected to be lower as the total number Nlv of the specific cells increases. By using the total number Nlv of the specific cells, a flow rate adjustment of the coolant in which the actual calorific value is accurately reflected can performed.

B. Second Embodiment

Figure 4:
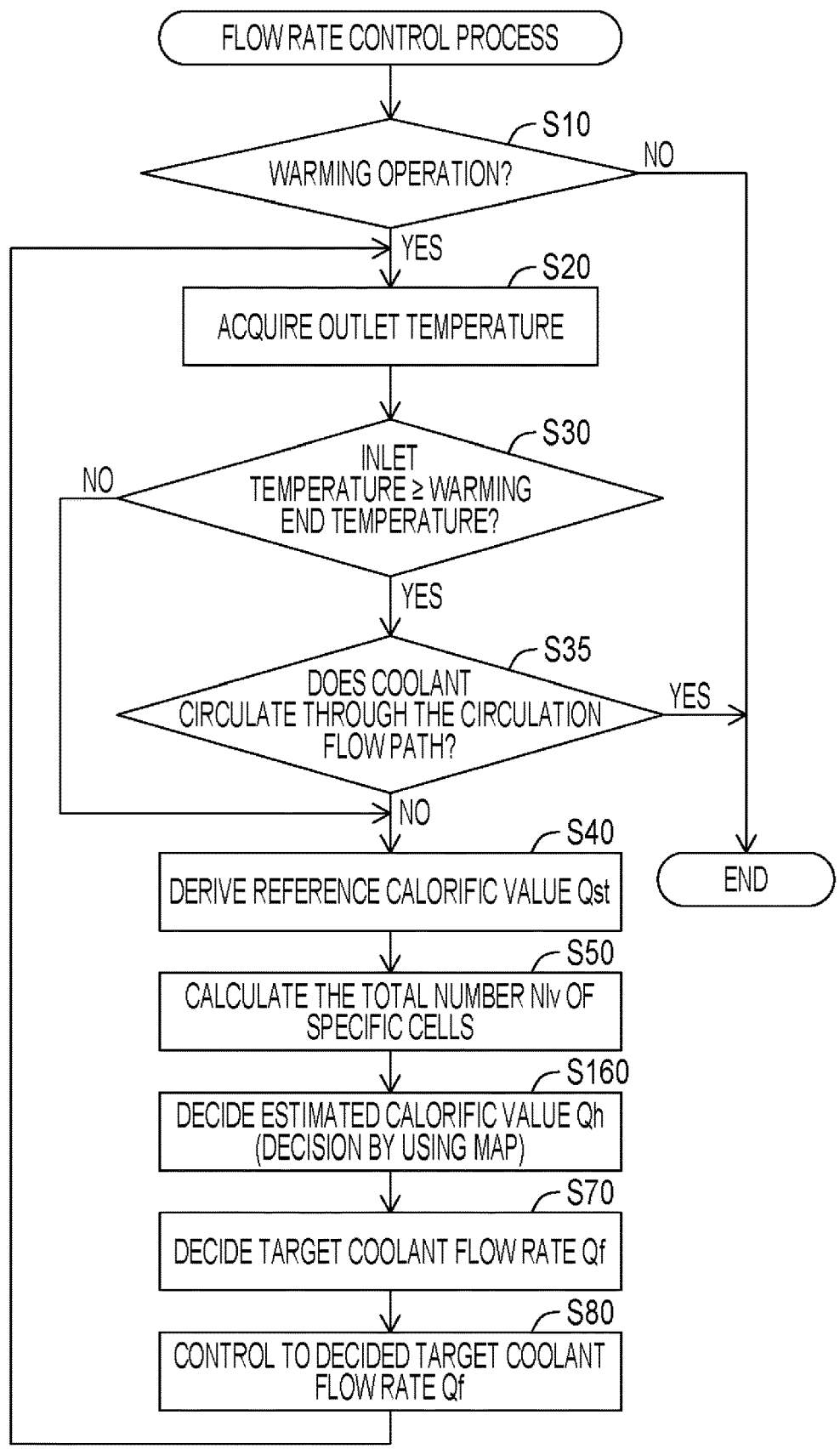
FIG. 4 is a flowchart of a flow rate control process according to a second embodiment.

A flow rate control process according to a second embodiment will be described with reference to FIG. 4. The flow rate control process according to a second embodiment is different from the flow rate control process according to the first embodiment in the decision method of the estimated calorific value Qh. The same processing steps as the processing steps of the flow rate control process according to the first embodiment are designated by the same reference numerals, and detailed description thereof will be omitted.

Figure 5:
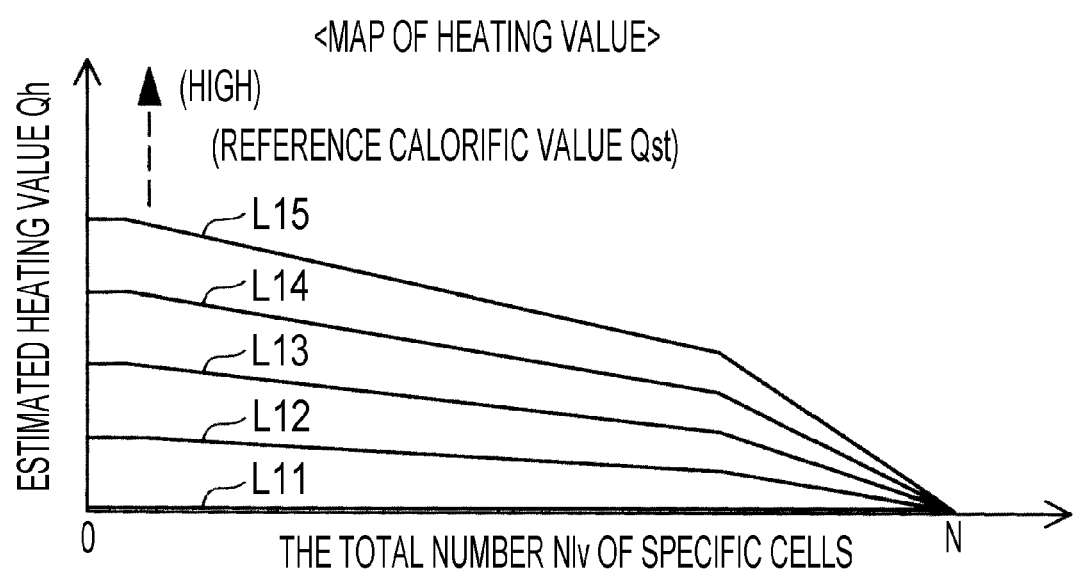
FIG. 5 is a map of a calorific value according to the second embodiment.

The controller 80 executes steps S10 to S50 as in the first embodiment. The controller 80 decides the estimated calorific value Qh by using a map of the calorific value shown in FIG. 5 (step S160). The horizontal axis of FIG. 5 shows the total number Nlv of the specific cells and vertical axis shows the estimated calorific value Qh. In the map of the calorific value, the total number Nlv of the specific cells is associated with the estimated calorific value Qh. The characteristic lines L11 to L15 correspond to different reference calorific values Qs, and the reference calorific values Qst corresponding to L11, L12, L13, L14, L15 are larger in this order. The characteristic lines L11 to L15 have characteristics in which the estimated calorific value Qh decreases as the total number Nlv of the specific cells increases, and in a case where the total number Nlv of the specific cells is the total number N of the cells, the estimated calorific value Qh is zero. The controller 80 decides the calorific value corresponding to the total number Nlv of the specific cells calculated in step S50 as the estimated calorific value Qh in the characteristic lines L11 to L15 corresponding to the reference calorific value Qst derived in step S40. By using the map of the calorific value, as in the first embodiment, the estimated calorific value Qh is corrected to be lower with respect to the reference calorific value Qst as the total number Nlv of the specific cells increases. The map of the calorific value is obtained by an experiment, and is stored in the storage device 81 in advance. The controller 80 executes steps S70 and S80 as in the first embodiment.

According to the second embodiment described above, in step S160, the controller 80 decides the estimated calorific value Qh by using the map of the calorific value defined that the calorific value is lower as the total number Nlv of the specific cells increases. Therefore, the reference calorific value Qst can be corrected to be lower as the total number Nlv of the specific cells increases. Therefore, the same effect as the effect of the first embodiment can be obtained. That is, the target coolant flow rate Qf is decided based on the estimated calorific value Qh corrected based on the total number Nlv of the specific cells, whether the power generation reaction occurs for each cell 90 can be reflected in the decision of the estimated calorific value Qh. Therefore, a flow rate adjustment of the coolant in which the actual calorific value is accurately reflected can performed.

C. Other Embodiments (C1) In the first embodiment and the second embodiment, the reference calorific value Qst is calculated by using the detected voltage value and the detected current value, the reference calorific value Qst is corrected by using the total number Nlv of the specific cells, and the estimated calorific value Qh is decided. The decision method of the estimated calorific value Qh is not limited thereto, for example, a configuration may be adopted in which the calorific value is obtained for each cell 90, and the calorific value of the fuel cell 10 is obtained based on the total of the obtained calorific values of the cells 90. In this case, the calorific value may be regarded as zero for the cell 90 in which the detected cell voltage is equal to or lower than the reference voltage, and the calorific value of the cell 90 may be obtained by multiplying the value obtained by subtracting the detected cell voltage from the theoretical electromotive force by the detected current value for the cell 90 in which the detected cell voltage is larger than the reference voltage. Also, for the cell 90 regarding the calorific value as zero and in which the detected cell voltage is equal to or lower than the reference voltage, the calorific value corresponding to the detected cell voltage may be set as the calorific value of the cell 90 based on a predetermined correlation in which the calorific value of the cell 90 is associated with the cell voltage for example, the map.

(C2) In the fuel cell system 100 according to the first embodiment and the second embodiment, the cell voltage sensor 13 is provided in a unit of one cell 90. In the fuel cell system 100, in a case where the cell voltage sensor 13 that detects the voltage is provided in a unit of two or more cells 90 configuring a part of the cells 90, the total number Nlv of the specific cells need only be calculated as follows. For example, in a case where the cell voltage sensor 13 is provided in a unit of two cells 90, a first threshold voltage for specifying the cell voltage sensor 13 with which two cells 90 have the voltage equal to or lower than the reference voltage and a second threshold voltage for specifying the cell voltage sensor 13 with which any one of two cells 90 has the voltage equal to or lower than the reference voltage are used. Here, the second threshold voltage is a value larger than the first threshold voltage, and is a value depending on the average voltage of the first threshold voltage and the target cell voltage. In a case where the detected cell voltage is equal to or lower than the first threshold voltage, the specific cell is counted to be two. In a case where the detected cell voltage is larger than the first threshold voltage and equal to or lower than the second threshold voltage, the specific cell is counted to be one. In a case where the detected cell voltage is larger than the second threshold voltage, the specific cell is counted to be 0. Even in a case where the cell voltage sensor 13 is provided in a unit of three or more cells 90, the threshold voltage for counting the specific cells can be increased and the total number Nlv of the specific cells can be counted by the same method. Also, even in a case where the cell voltage sensor 13 provided in a unit of one cell 90 and the cell voltage sensor 13 provided in a unit of cells 90 are mixed in the fuel cell system 100, the total number Nlv of the specific cells can be calculated by storing information in which the number of the cell voltage sensor 13 is associated with the detected number of the cells 90 in the storage device 81.

(C3) In the first embodiment, the estimated calorific value Qh is decided by using Equation (2) by using a ratio of the number obtained by subtracting the total number Nlv of the specific cells from the total number N of the cells to the total number N of the cells (step S60). In a case where the cell voltage sensor 13 that detects the voltage in a unit of the cells 90 is included in the fuel cell system 100, as in (C2), the controller 80 may count the number of the specific cells in which the cell voltage is equal to or lower than the reference voltage and set the counted value as the total number Nlv of the specific cells in Equation (2). Alternatively, the controller 80 may count solely the cells 90 in which all of the cells 90 detected by the cell voltage sensor 13 have the cell voltage equal to or lower than the reference voltage and set the counted value as the total number Nlv of the specific cells in Equation (2) (counting method a). Alternatively, the controller 80 may count solely the cells 90 in which none of the cells 90 detected by the cell voltage sensor 13 have the cell voltage not equal to or lower than the reference voltage and set a value obtained by subtracting the counted value from the total number N of the cells as the total number Nlv of the specific cells in Equation (2) (counting method b). In a case where the counting method a and the counting method b are used, any one of the determination processes using the first threshold voltage and the second threshold voltage in (C2) can be reduced, and thus the process can be simplified. Also, even in a case where the counting method a and the counting method b are used, the number of the cells 90 in which the cell voltage is equal to or lower than the reference voltage can be roughly reflected in the estimated calorific value Qh.

(C4) in the fuel cell system 100 according to the first embodiment, the temperature sensor is not provided at the inlet p1, and the inlet temperature is estimated based on the detected temperature of the temperature sensor 17. On the other hand, the temperature sensor may be provided near the inlet p1, and a detected temperature of the temperature sensor provided near the inlet p1 may be set as the inlet temperature.

(C5) In the fuel cell system 100, the bypass flow path 163 is provided in the cooling system circuit 60. On the other hand, a configuration may be adopted in which the bypass flow path 163 is not provided in the cooling system circuit 60. In this configuration, it is preferable that the fan of the radiator 64 be stopped in the warming operation. In the configuration in which the bypass flow path 163 is not provided, the flow path formed by the coolant manifold 91, the coolant discharge path 162, the radiator 64, and the coolant supply path 161 is the circulation flow path R1. Also, the flow path formed by the coolant discharge path 162, the radiator 64, and the coolant supply path 161 is the external flow path. Further, the coolant flow rate is decided by referring to the map of the coolant, but the coolant flow rate may be decided, instead of the map, by being calculated by using the relationship expression representing the relationship of the calorific value, the outlet temperature, and the coolant flow rate of the fuel cell 10. Further, the order of executing steps S40 and S50 in the flow rate control process is not limited to the above, and step S40 may be executed after step S50, or may be executed at the same time.

(C6) In the first embodiment and the second embodiment, during the warming operation, regardless of whether the inlet temperature is lower than the lower limit temperature in the temperature range in which the generated water does not freeze, the target coolant flow rate Qf is decided by using the estimated calorific value Qh decided by using the total number Nlv of the specific cells, and the outlet temperature. On the other hand, in a case where the inlet temperature is equal to or higher than the lower limit temperature in the temperature range in which the generated water does not freeze, the characteristic line L7 in which the coolant flow rate is constant regardless of the calorific value is applied, and thus a configuration in which the processing step of deciding the estimated calorific value Qh is skipped may be adopted. Specifically, processing contents may be adopted in which a processing step of determining whether the inlet temperature is equal to or higher than the lower limit temperature in the temperature range in which the generated water does not freeze is provided after step S30, in a case where the inlet temperature is equal to or higher than the lower limit temperature in the temperature range in which the generated water does not freeze, steps S40 to S60 are skipped, and in a case where the inlet temperature is lower than the lower limit temperature in the temperature range in which the generated water does not freeze, steps S40 to S60 are executed. With this configuration, in a case where the inlet temperature is equal to or higher than the lower limit temperature in the temperature range in which the generated water does not freeze, steps S40 to S60 can be reduced.

(C7) In the first embodiment and the second embodiment, in the normal operation, the target coolant flow rate Qf is decided by using the characteristic line Ls included in the map. The decision method of the target coolant flow rate Qf in the normal operation is not limited thereto, any method may be used as long as the decision is made by using the estimated calorific value. For example, the method below may be used. The outlet temperature rises with respect to the inlet temperature depending on the calorific value of the fuel cell 10, and thus the inlet temperature can be estimated based on the outlet temperature detected by the temperature sensor 16 and the calculated reference calorific value Qst. The target coolant flow rate Qf is decided depending on the estimated inlet temperature by using the predetermined correlation, such as the map, of inlet temperature and the target coolant flow rate Qf. The coolant flow rate in the predetermined correlation of the inlet temperature and the target coolant flow rate Qf is set to be larger than the coolant flow rate at the same estimated calorific value in the first case. The controller 80 adjusts the opening degrees of the circulation pump 65 and the three-way valve 164 such that the target coolant flow rate Qf. With this method, the coolant flow rate can be adjusted by using the detected outlet water temperature, in addition to the reference calorific value Qst.

(C8) In the first embodiment and the second embodiment, in step S70, the controller 80 selects any of the characteristic lines L1 to L6 in the first case where the inlet temperature is lower than the lower limit temperature in the temperature range in which the generated water does not freeze. The determination on whether the inlet temperature is lower than the lower limit temperature in the temperature range in which the generated water does not freeze may be made by using the outlet temperature. In this case, in a case where the outlet temperature is equal to or higher than 0° C. and coolant circulates through the circulation flow path R1 after the determination is made that the outlet temperature is equal to or higher than 0° C., the determination is made that the inlet temperature is not lower than the lower limit temperature in the temperature range in which the generated water does not freeze. Also, processing contents may be adopted in which in other cases, the determination of the first case where the inlet temperature is lower than the lower limit temperature in the temperature range in which the generated water does not freeze is made. Therefore, the determination on whether the inlet temperature is lower than the lower limit temperature in the temperature range in which the generated water does not freeze can be made by using the outlet temperature.

The present disclosure is not limited to the above-described embodiments, and can be realized with various configurations without departing from the spirit of the present disclosure. For example, the technical features of the embodiments corresponding to the technical features in each mode described in the section of the summary of the disclosure can be appropriately replaced or combined to solve some or all of the above objects, or to achieve some of or all the above effects. When the technical features are not described as essential in the present specification, the features can be deleted as appropriate.

What is claimed is:

1. A fuel cell system comprising:
   a fuel cell in which cells of a plurality of cells are stacked;
   a current sensor configured to detect a current of the fuel cell;
   a plurality of cell voltage sensors configured to detect a voltage in a unit of one or two or more cells among the cells;
   a circulation flow path of a cooling medium having an internal flow path that is formed inside the fuel cell and an external flow path that is connected to the internal flow path and formed outside the fuel cell;
   a circulation pump disposed in the external flow path and configured to adjust a flow rate of the cooling medium;
   a voltage sensor configured to detect a total voltage of the fuel cell, and
   a controller programmed to, in a first case where a temperature of the cooling medium at an inlet of the external flow path to the internal flow path is lower than a predetermined threshold value, decide the flow rate of the cooling medium based on an estimated calorific value such that the flow rate of the cooling medium is lower than that of a case where the estimated calorific value is the same in a normal operation of the fuel cell, control an operation of the circulation pump, and adjust the flow rate of the cooling medium in the circulation flow path to the decided flow rate,
   wherein the controller is programmed to, in the first case, estimate a calorific value of the fuel cell by using each detected cell voltage value detected by the cell voltage sensors and a detected current value detected by the current sensor, decide the flow rate of the cooling medium based on the estimated calorific value, and control the operation of the circulation pump; and
   wherein the controller is programmed to calculate a total number of specific cells that are cells in which a cell voltage is equal to or lower than a predetermined reference voltage by using the detected cell voltage value, correct a reference calorific value derived by using the detected current value and a detected voltage value detected by the voltage sensor to be lower as the total number of the specific cells increases, and estimate the calorific value.

2. The fuel cell system according to claim 1, wherein the controller is programmed to correct the reference calorific value by multiplying the reference calorific value by a ratio of the number obtained by subtracting the total number of the specific cells from a total number of the cells to the total number of the cells, and estimate the calorific value.

3. The fuel cell system according to claim 1, wherein the controller is programmed to, for each reference calorific value, correct the reference calorific value by using a map in which the calorific value is associated with the total number of the specific cells, the map having the calorific value being lower as the total number of the specific cells increases, and estimate the calorific value.

* * * * *